United States Patent
Sommers

(10) Patent No.: US 11,032,151 B1
(45) Date of Patent: Jun. 8, 2021

(54) METHODS, SYSTEMS, AND COMPUTER READABLE MEDIA FOR PROVIDING DYNAMICALLY CONFIGURABLE, DISTRIBUTED NETWORK VISIBILITY DEVICE

(71) Applicant: Keysight Technologies, Inc., Santa Rosa, CA (US)

(72) Inventor: Christian Paul Sommers, Bangor, CA (US)

(73) Assignee: KEYSIGHT TECHNOLOGIES, INC., Santa Rosa, CA (US)

(*) Notice: Subject to any disclaimer, the term of this patent is extended or adjusted under 35 U.S.C. 154(b) by 0 days.

(21) Appl. No.: 16/269,498

(22) Filed: Feb. 6, 2019

(51) Int. Cl.
*H04L 29/08* (2006.01)
*H04L 12/24* (2006.01)
*H04L 12/26* (2006.01)

(52) U.S. Cl.
CPC .......... *H04L 41/20* (2013.01); *H04L 41/0803* (2013.01); *H04L 43/045* (2013.01); *H04L 67/10* (2013.01)

(58) Field of Classification Search
CPC ... H04L 41/20; H04L 41/0803; H04L 43/045; H04L 67/10
See application file for complete search history.

(56) References Cited

U.S. PATENT DOCUMENTS

| | | | |
|---|---|---|---|
| 7,272,822 B1 | 9/2007 | Riggins et al. | |
| 8,028,276 B1 | 9/2011 | Bessonov | |
| 8,402,435 B1 | 3/2013 | Spiro | |
| 9,891,898 B1* | 2/2018 | Tonsing | G06F 8/41 |
| 10,164,829 B1 | 12/2018 | Watson et al. | |
| 10,225,381 B1 | 3/2019 | Bosshart | |
| 10,581,491 B2 | 3/2020 | Won et al. | |
| 10,686,671 B1 | 6/2020 | Mozumdar et al. | |
| 10,733,088 B1 | 8/2020 | Sommers | |
| 10,868,730 B2 | 12/2020 | Mozumdar et al. | |
| 10,880,197 B2 | 12/2020 | Naskar et al. | |

(Continued)

FOREIGN PATENT DOCUMENTS

| | | |
|---|---|---|
| CN | 107749802 A | 3/2018 |
| CN | 110719212 A | 1/2020 |

OTHER PUBLICATIONS

Non-Final Office action for U.S. Appl. No. 16/181,309 (dated Oct. 28, 2019).

(Continued)

*Primary Examiner* — Viet D Vu

(57) ABSTRACT

A method for providing a dynamically configurable, distributed network visibility device includes providing at least one target network visibility device for monitoring network packets, where the at least one target network visibility device includes a P4-configurable switching module. The method further includes providing a controller for receiving a P4 code package including or compilable into a P4 device image and a non-P4 plugin. The method further includes loading the P4 device image into the P4 configurable switching module of the at least one target network visibility device to configure the P4-configurable switching module to implement a desired network visibility device feature. The method further includes using the non-P4 plugin to render a user interface or to extend functionality of the at least one target network visibility device.

20 Claims, 5 Drawing Sheets

(56) References Cited

U.S. PATENT DOCUMENTS

| | | | |
|---|---|---|---|
| 2006/0168205 A1* | 7/2006 | Barron | H04L 41/12 709/224 |
| 2006/0259629 A1 | 11/2006 | Usmani et al. | |
| 2009/0112505 A1 | 4/2009 | Engel et al. | |
| 2011/0145649 A1 | 6/2011 | Nilsson et al. | |
| 2011/0183613 A1* | 7/2011 | Nocera | H04M 1/7253 455/41.2 |
| 2012/0033678 A1* | 2/2012 | Page | H04L 45/28 370/401 |
| 2013/0152047 A1 | 6/2013 | Moorthi et al. | |
| 2014/0157245 A1 | 6/2014 | Krueger | |
| 2015/0088827 A1 | 3/2015 | Xu et al. | |
| 2015/0172208 A1 | 6/2015 | DeCusatis et al. | |
| 2015/0234725 A1 | 8/2015 | Cillis et al. | |
| 2015/0365325 A1 | 12/2015 | Hwang et al. | |
| 2016/0234089 A1 | 8/2016 | Nyerges et al. | |
| 2017/0093986 A1 | 3/2017 | Kim et al. | |
| 2017/0237632 A1 | 8/2017 | Hegde et al. | |
| 2018/0210823 A1 | 7/2018 | Vorganti | |
| 2018/0255027 A1 | 9/2018 | Winig et al. | |
| 2018/0316608 A1 | 11/2018 | Dowlatkhah et al. | |
| 2019/0014395 A1 | 1/2019 | Anand et al. | |
| 2019/0065349 A1 | 2/2019 | Sharma et al. | |
| 2019/0199654 A1* | 6/2019 | Pope | G06N 20/00 |
| 2019/0222481 A1 | 7/2019 | Hira | |
| 2019/0260682 A1 | 8/2019 | Ewert | |
| 2019/0379588 A1* | 12/2019 | Rao | H04L 47/125 |
| 2020/0021512 A1 | 1/2020 | Naskar et al. | |
| 2020/0267059 A1 | 8/2020 | Mozumdar et al. | |
| 2020/0401504 A1 | 12/2020 | Sommers et al. | |

OTHER PUBLICATIONS

Commonly-assigned, co-pending U.S. Appl. No. 16/446,318 for "Methods, Systems, and Computer Readable Media for Configuring a Test System Using Source Code of a Device Being Tested," (Unpublished, filed Jun. 19, 2019).

Commonly-assigned, co-pending U.S. Appl. No. 16/290,426 for "Methods, Systems, and Computer Readable Media for Testing a Network Node or a Related Application Programming Interface Using Source Code Metadata," (Unpublished, filed Mar. 1, 2019).

Zhang et al., "HyperVDP: High-Performance Virtualization of the Programmable Data Plane," IEEE Journal of Selected Areas in Communications, vol. 37, No. 3, pp. 556-569 (Mar. 2019).

"Dynamic Test-Based P4 Packet Blaster Hardware Configuration," IPCOM000257013D, pp. 1-6.

"P4Runtime Specification," The P4.org API Working Group, version 1.0.0, pp. 1-97 (Jan. 29, 2019).

"p4lang / switch," https://github.com/p4lang/switch, pp. 1-4 (Copyright 2019).

Rodriguez et al., "BB-Gen: A Packet Crafter for P4 Target Evaluation", SIGCOMM Posters and Demos '18, pp. 1-3 (Aug. 20-25, 2018).

Anand et al., "POINT: An Intent-driven Framework for Integrated Packet-Optical In-band Network Telemetry," Infinera Corporation, pp. 1-6 (2018).

Iša et al., "Verification of Generated RTL from P4 Source Code," 2018 IEEE 26th International Conference on Network Protocols, pp. 1-2 (2018).

McKeon et al., "P4 Runtime—Putting the Control Plane in Charge of the Forwarding Plane," The P4 Language Consortium, pp. 1-6 (Dec. 4, 2017).

Papneja et al., "Basic BGP Convergence Benchmarking Methodology for Data-Plane Convergence," RFC 7747, pp. 1-35 (Apr. 2016).

Ginoza, "Request for Comments Summary RFC Nos. 2800-2899," RFC 2899, pp. 1-22 (May 2001).

Bradner et al., "Benchmarking Methodology for Network Interconnect Devices," RFC 2544, pp. 1-31 (Mar. 1999).

"Sparkline," Wikipedia, https://en.wikipedia.org/wiki/Sparkline, pp. 1-3 (2019).

"The World's Fastest & Most Programmable Networks," Barefoot Networks, https://barefootnetworks.com/resources/worlds-fastest-most-programmable-networks/, pp. 1-10 (publication date unknown) (believed to be prior to Feb. 6, 2019).

"P4Runtime Specification," The P4.org API Working Group, Version 1.0.0-rc4, pp. 1-72 (Jan. 25, 2019).

"Cubro Sessionmaster EXA48600," Cubro Network Visability, pp. 1-5 (2019).

Commonly-assigned, co-pending U.S. Appl. No. 16/181,309 for "Methods, Systems, and Computer Readable Media for Testing Network Elements of an In-Band Network Telemetry Capable Network," (Unpublished, filed Nov. 5, 2018).

Commonly-assigned, co-pending U.S. Appl. No. 16/035,534 for "Methods, Systems, and Computer Readable Media for Testing a Network Node Using Source Code," (Unpublished, filed Jul. 13, 2018).

Saha et al., "Fault Detection Effectiveness of Source Test Case Generation Strategies for Metamorphic Testing," MET, arXiv:1802.07361v1, pp. 1-8 (Feb. 20, 2018).

Nötzli, "p4pktgen: Automated Test Case Generation for P4 Prorams," SOSR '18, pp. 1-7 (Mar. 28-29, 2018).

Anand, Madhukar et al., "POINT: An Intent-driven Framework for Intergrated Packet-Optical In-band Network Telemetry," Infinera Corporation, pp. 1-6 (2018).

Liang, Jianzhe et al., "In-band Network Function Telemetry," Tsinghua University, pp. 1-3 (Aug. 20-25, 2018).

"Test Case Management for Improved QA," Perforce, pp. 1-13 (2018).

"Cubro's network packet broker evolution," Cubro Blog, pp. 1-3 (Jan. 15, 2018).

P4 (programming language), Wikipedia, https://en.wikipedia.org/w/index/php?title=P4_(programming_language)&oldid=812348591, pp. 1-3 (Nov. 27, 2017).

"P416 Language Specification," The P4 Language Consortium, version 1.0.0, pp. 1-129 (May 22, 2017).

Hyun, Jonghwan et al., "Knowledge-Defined Networking using In-band Network Telemetry," Department of Computer Science and Engineering, POSTECH, pp. 1-4 (2017).

Van, Tu Nguyen et al., "Towards ONOS-based SDN Monitoring using In-band Network Telemetry," Department of Computer Science and Engineering, POSTECH, pp. 1-6. (2017).

Shahbaz et al., "PISCES: A Programmable, Protocol-Independent Software Switch," SIGCOMM'16, pp. 1-14 (Aug. 22-26, 2016).

Kim et al., "In-band Network Telemetry via Programmable Dataplanes," pp. 1-2 (2015).

Non-Final Office Action for U.S. Appl. No. 16/035,534 (dated Apr. 13, 2010).

Hill et al., "Tracking Network Flows with P4," University of Amsterdam, System and Network Engineering, pp. 1-16 (2018).

Notice of Allowance and Fee(s) Due for U.S. Appl. No. 16/181,309 (dated Mar. 19, 2020).

Notice of Allowance and Fee(s) Due for U.S. Appl. No. 16/290,426 (dated Mar. 18, 2020).

Notice of Allowance and Fee(s) Due for U.S. Appl. No. 16/869,129 (dated Sep. 28, 2020).

Commonly-assigned, co-pending U.S. Appl. No. 16/869,129 for "Methods, Systems, and Computer Readable Media for Testing Network Elements of an In-Band Network Telemetry Capable Network," (Unpublished, filed May 7, 2020).

Notice of Allowance and Fee(s) Due for U.S. Appl. No. 16/290,426 (dated May 7, 2020).

Notice of Allowance and Fee(s) Due for U.S. Appl. No. 16/035,534 (dated Aug. 27, 2020).

Non-Final Office Action for U.S. Appl. No. 16/446,318 (dated Feb. 4, 2021).

* cited by examiner

METHODS, SYSTEMS, AND COMPUTER READABLE MEDIA FOR PROVIDING DYNAMICALLY CONFIGURABLE, DISTRIBUTED NETWORK VISIBILITY DEVICE

TECHNICAL FIELD

The subject matter described herein relates to implementing network visibility device features. More particularly, the subject matter described herein relates to methods, systems, and computer readable media for providing a dynamically configurable, distributed network visibility device.

BACKGROUND

Network visibility devices, such as network packet brokers and network tool optimizers, are used to monitor packets in a communications network and provide copies of the packets to one or more network tools. Network visibility devices often have diverse feature sets that require firmware updates, updates to the operating system, or both to implement. Examples of common network visibility device features include packet filtering, packet de-duplication, packet replication, masking, custom statistics generation, etc.

The turnaround time for adding a new feature to a network visibility device is on the order of months. It is desirable to be able to more rapidly develop and deploy network visibility device features.

Accordingly, there exists the need for a dynamically configurable network visibility device that avoids at least some of the difficulties associated with the development cycles of adding new features to a conventional network visibility device.

SUMMARY

The subject matter described herein includes methods, systems, and computer readable media for providing a dynamically configurable, distributed network visibility device. One method for providing a dynamically configurable, distributed network visibility device includes providing at least one target network visibility device for monitoring network packets, wherein the at least one target network visibility device includes a P4-configurable switching module. The method further includes providing a controller for receiving a P4 code package including or compilable into a P4 device image and one or more non-P4 plugins. The method further includes loading the P4 device image into the P4 configurable switching module of the at least one target network visibility device and using the P4 device image to configure the configurable switching module of the at least one target network visibility device to implement a desired network visibility device feature. The controller and/or the at least one target network visibility device uses the non-P4 plugin(s) to render a user interface or to extend functionality of the at least one target network visibility device.

In one example, providing at least one target network visibility device includes providing at least one network packet broker.

In another example, providing a least one target network visibility device includes providing at least one network tool optimizer.

In yet another example, the P4-configurable switching module comprises a P4-configurable hardware or firmware module.

In yet another example, the P4-configurable switching module comprises a virtual P4-configurable switching module.

In yet another example, the non-P4 plugin automatically renders at least one user interface element for displaying packet statistics.

In yet another example, the at least one user interface element comprises a packet statistics table and a popup graph accessible via the packet statistics table.

In yet another example, the non-P4 plugin transforms a user-facing load balancing table into a P4 runtime load balancing table.

In yet another example, the non-P4 plugin automatically initializes values in a network address table.

In yet another example, the plugin extends the functionality of the target network visibility device without requiring modification of code resident on the target network visibility device.

The subject matter described herein further includes a system for providing a dynamically configurable, distributed network visibility device. The system includes at least one target network visibility device for monitoring network packets, wherein the at least one target network visibility device includes a P4-configurable switching module. The system further includes a controller for receiving a P4 code package including or compilable into a P4 device image and a non-P4 plugin. The at least one target network visibility device loads the P4 device image into the configurable switching module and uses the P4 device image to configure the configurable switching module to implement a desired network visibility device feature. The controller and/or the at least one target network visibility device uses the non-P4 plugin(s) to render a user interface or to extend functionality of the at least one target network visibility device.

In one example, the at least one target network visibility device includes at least one network packet broker.

In another example, the at least one target network visibility device includes at least one network tool optimizer.

In yet another example, the P4-configurable switching module comprises a P4-configurable application specific integrated circuit.

In yet another example, the P4-configurable switching module comprises a virtual P4-configurable switching module.

In yet another example, the non-P4 plugin automatically renders at least one user interface element for displaying packet statistics.

In yet another example, the at least one user interface element comprises a packet statistics table and a popup graph accessible via the packet statistics table.

In yet another example, the non-P4 plugin transforms a user-facing load balancing table into a P4 runtime load balancing table.

In yet another example, the non-P4 plugin automatically initializes values in a network address table.

According to another aspect of the subject matter described herein, a non-transitory computer readable medium having stored thereon executable instructions that when executed by a processor of a computer controls the computer to perform steps. The steps include providing at least one target network visibility device for monitoring network packets, wherein the target network visibility device includes a P4-configurable switching module. The steps further include providing a controller for receiving a P4 code package including or compilable into a P4 device image and a non-P4 plugin. The steps further include loading the P4 device image into the P4-configurable switching module of the at least one target network visibility device to configure the P4-configurable switching module of the at least one target network visibility device to implement a desired network visibility device feature. The steps further include using the non-P4 plugin(s) to generate or render a user interface or to extend functionality of the at least one target network visibility device.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
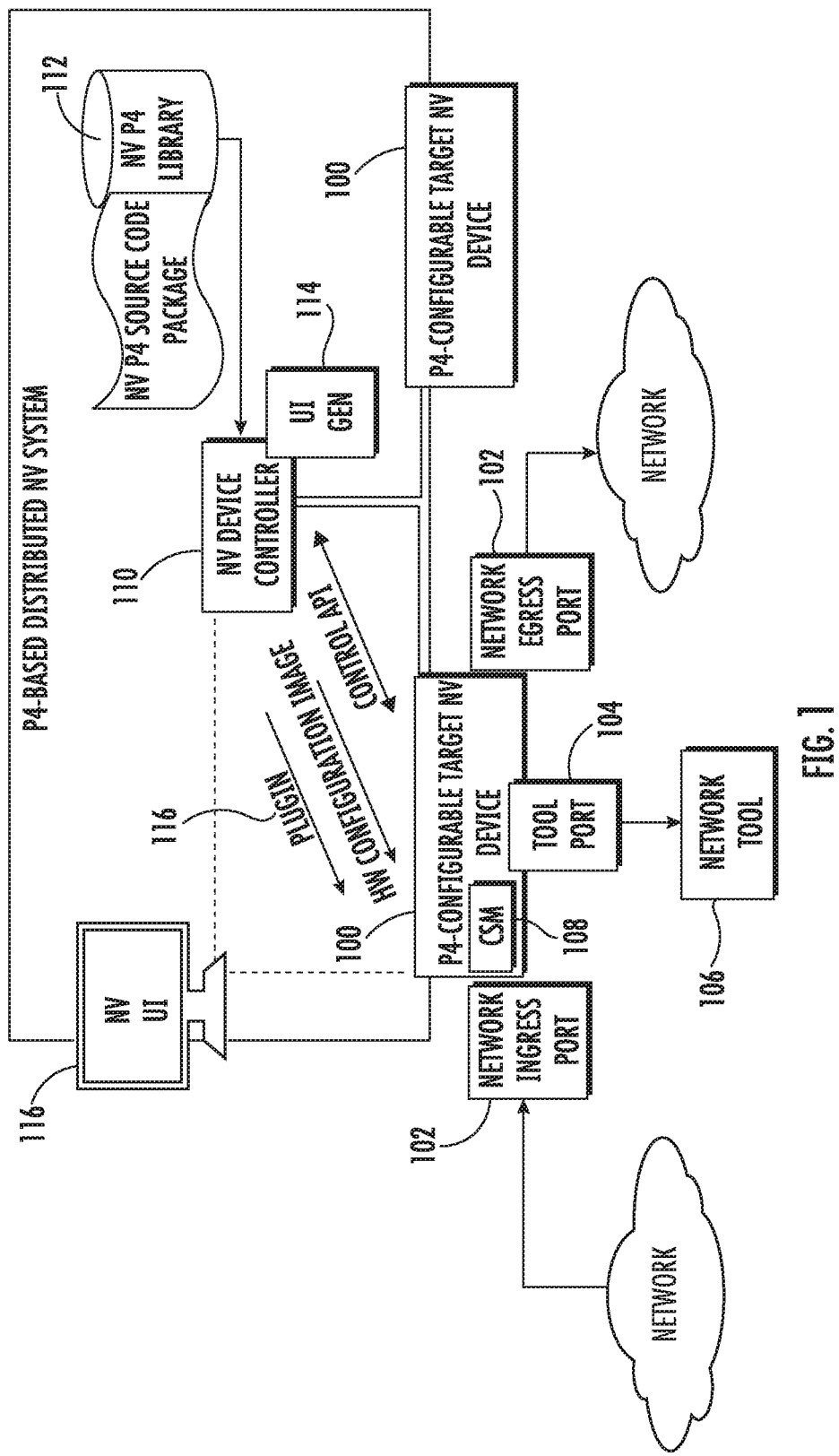
FIG. 1 is a network diagram of a dynamically configurable, distributed Network visibility system.

FIG. 1 is a network diagram illustrating a dynamically configurable, distributed network visibility system. In the illustrated example, the system includes one or more target network visibility devices 100 that implement network visibility features. The network visibility devices 100 may be network packet brokers or network tool optimizers. In the illustrated example, each network visibility device 100 includes network ports 102 for receiving packets from the monitored network and providing packets back to the monitored network. Each target network visibility device 100 may also include one or more tool ports 104 that provide monitored packets to one or more network tools 106. An example of the network tool is a network security tool or a network performance monitoring tool.

Each network visibility device 100 may also include a configurable switch module 108. In one example, each configurable switch module 108 maybe a Tofino or Tofino 2 switch module available from Barefoot Networks (www.barefootnetworks.com). The Tofino and Tofino 2 are application specific integrated circuits (ASICs) that are configurable using the P4 programming language, which enables rapid feature development. The P4 programming language is maintained by the P4 Language Consortium and is published at https://p4.org. In an alternate implementation, rather than implementing configurable switch modules 108 using the Tofino or Tofino 2 devices from Barefoot Networks, each configurable switch module 108 may be a P4 configurable ASIC, smart NIC or FPGA available from a different manufacturer or a virtual P4-configurable device.

In FIG. 1, the system further includes a network visibility device controller 110. Network visibility device controller 110 deploys network visibility code to target devices 100 and presents a user interface for accessing and controlling network visibility device features. In the example illustrated in FIG. 1, network visibility device controller 110 receives P4 source code packages from a P4 source code library 112. Each package may implement a desired network visibility device feature. The packages may also include P4 code annotation, which may be used to automatically generate a user interface (UI), including a command line interface (CLI), a graphical user interface (GUI) or combination of a CLI and a GUI. As such, network visibility device controller 110 may include a UI generator 114 that automatically generates a network visibility device user interface 116 based on annotations to P4 source code. The annotations may reference non-P4 plugins that are used to enhance or provide network visibility device functionality. Examples of P4 code annotation and user interfaces that may be generated by UI generator 114 will be described in detail below.

Network visibility device controller 110 may also receive and deploy plugins 116 that operate with P4 images to the enhance the functionality provided by network visibility devices. Plugins may be written in programming languages other than P4 (such as Python) to provide functionality that is not provided by the P4 programming language. Examples of plugins will also be provided below.

Figure 2:
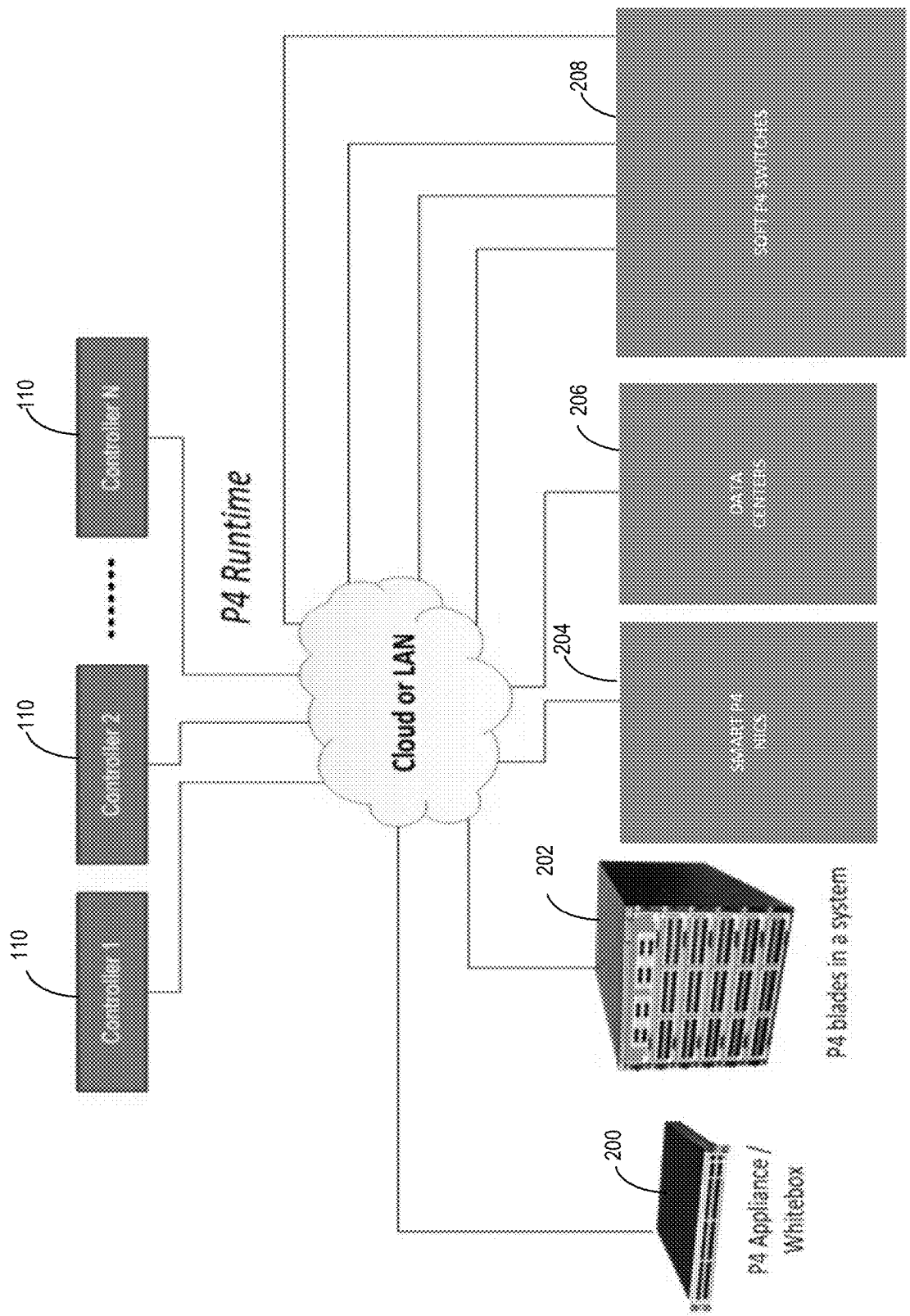
FIG. 2 is a block diagram illustrating different types of target devices on which network visibility features can be implemented.

FIG. 2 is a diagram illustrating the examples of target devices that can be configurable using the P4 runtime environment. The P4 runtime environment is an application programming interface (API) that may be presented by a P4-configurable device. In the illustrated example, controllers 110 provide P4 images compliant with the P4 run time API to a plurality of different targeted target devices. The target devices that may be used to implement the network visibility devices 100 illustrated in FIG. 1 include a P4 appliance/white box 200, P4 blades 202 in a rack or other type of system, P4 smart network interface cards (NICs) 204, P4 compliant data center equipment 206, and virtual network functions 208 that include virtual switches that are P4-configurable. Any of devices 200, 202, 204, 206, and 208 may be used implement network visibility features and may be dynamically configured using the methodology described herein.

Figure 3:
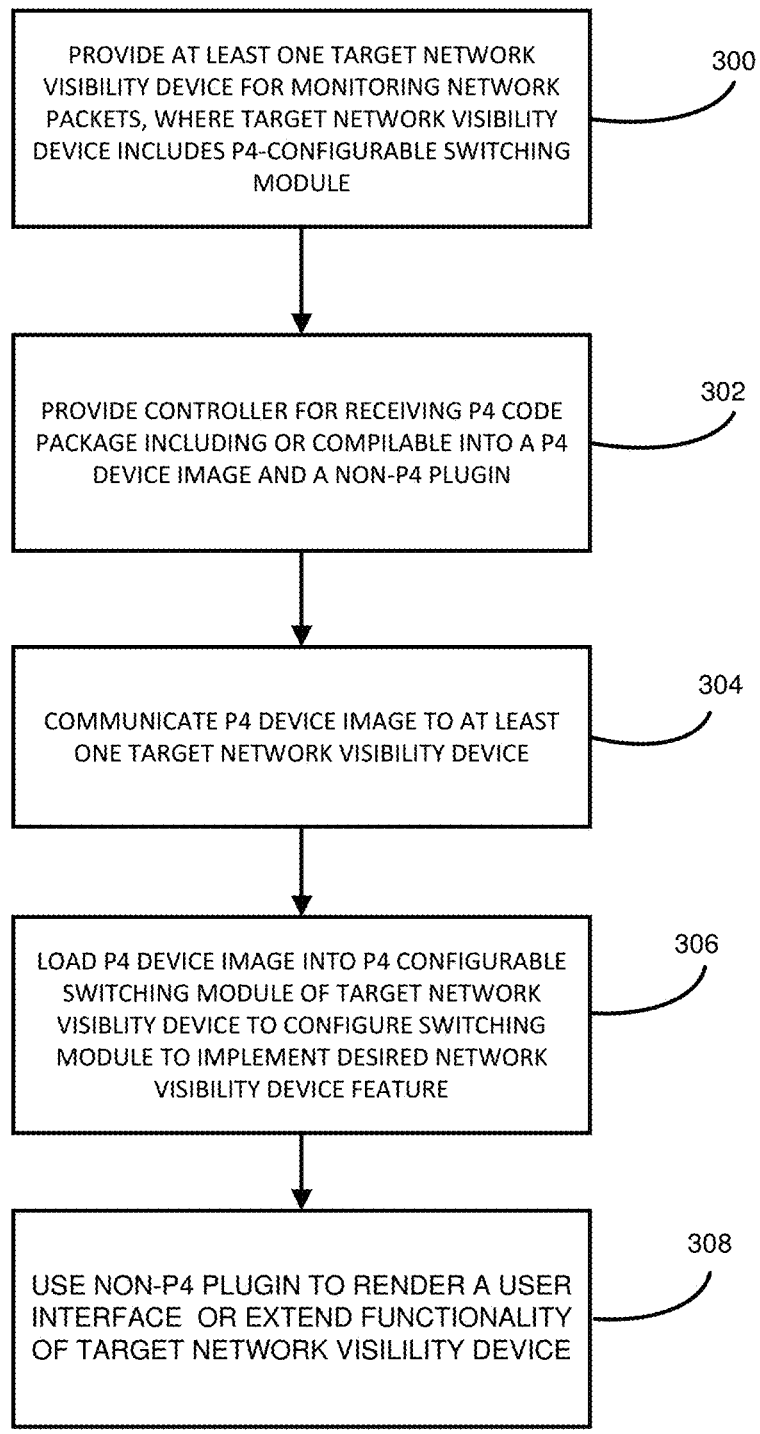
FIG. 3 is a flow chart of an exemplary process for implementing a dynamically configurable, distributed network visibility device.

FIG. 3 is a flow chart illustrating an exemplary process for providing a dynamically configurable, distributed network visibility device. Referring to FIG. 3, in step 300, the process includes providing at least one target network visibility device for monitoring network packets, where the target network visibility device includes a P4-configurable switching module for controlling switching of monitored packets to one or more network tools. For example, the process may include providing one or more target network visibility devices 100 that perform network visibility functions, such as network tool optimizer or network packet broker functions. The target network visibility devices may include P4-configurable switching modules, such as Tofino ASICs or other P4-configurable switching modules.

In step 302, the process includes providing a controller for receiving a P4 code package including or compilable into a P4 device image and a non-P4 plugin. In one example, the P4 code package may be a P4 source code package with annotation referencing a non-P4 plugin. In another example, the P4 code package may be a precompiled version of the P4 device image and the plugin. Controller 110 illustrated in FIG. 1 may receive P4 packages that reference non-P4 plugins from developers.

In FIG. 1, controller 110 is located remotely from target devices 100, so controller may communicate the P4 device images to target devices 110. Accordingly, in such an implementation, in step 304, the process includes communicating the P4 device image and to at least one target network visibility device. For example, controller 110 may communicate the P4 device image to target network visibility devices 100 by transmitting the P4 device image over a network to each target network visibility device 100. In another implementation, controller may be implemented on each of target network visibility devices 100. In such an implementation, step 304 may be omitted.

In step 306, the process includes loading the P4 device image into the configurable switching element of at least one target network visibility device to dynamically configure the P4-configurable switching element of the at least one target network visibility device to implement a desired network visibility device feature. For example, each target device 100 illustrated in FIG. 1 may load the P4 device image received from controller 110 and configure their respective configurable switching modules 108 to implement desired network visibility device features. Examples of network visibility device features that may be implemented include packet filtering features, packet de-duplication features, packet statistics generation features, etc.

In step 308, the process includes using the non-P4 plugin to render a user interface or to extend functionality of the at least one target network visibility device. In one example, the plug-in code is used by controller 110 to automatically render a user interface, for example, for accessing packet statistics generated by one or more of target network visibility devices 100. In another example, the plugin code may be loaded into the target network visibility devices themselves to extend functionality of the devices. For example, as will be described in detail below, a transform plugin may be used to transform a user-facing load balancing table into a P4 runtime table used to load balance packets among network visibility device ports. Loading the plugin code into controller 110 and/or network visibility devices 100 is intended to be within the scope of the subject matter described herein.

Examples of the uses of P4 code in combination with plugin code to implement network visibility device features will now be described.

Example 1—Transform Plugin

In this case, the application software on controller 110 would invoke a plugin module provided with the P4 code from the P4 developers (non-P4 code, e.g., Python), which would allow one to extend the behavior of the application framework of network visibility devices 100 or controller 110 without modifying the main code (e.g., the operating system (OS) and other target network visibility device resident code). Instead, network visibility devices 100 or controller 110 execute the plugin to transform a user-friendly, user-facing configuration table (load balance weights) into the actual run-time P4 table which is user-unfriendly. The actual details of the rendered user-facing table can be implemented in the plugin itself.

Figure 4:
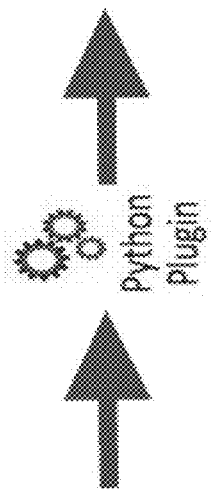
FIG. 4 is a diagram illustrating transformation of a user-facing load balancing table into a P4 runtime load balancing table.

FIG. 4 conceptually illustrates the user-facing and P4 runtime tables. In FIG. 4, a user-facing table 400 contains physical ports of a network visibility device and corresponding load balancing weights to be assigned to the physical ports. In order to implement such load balancing at runtime, a runtime table may include relative numbers of entries that correspond to the weights in user table 400. For example, the weight assigned to physical port 1.1 in user-facing table 400 is one and the weight assigned to physical port 1.2 is two. In runtime table 402, logical port 0x52 corresponds to physical port 1.2 and logical port 0x51 corresponds to physical port 1.1. Because physical port 1.2 is weighted twice as much as physical port 1.1, entries corresponding to logical port 0x52 appear twice as often in runtime table 402 as logical port 0x51. Runtime table 402 illustrated in FIG. 4 may include as many as 1,024 weighted entries and would be time consuming to be filled manually. Real-world implementations could have such tables which are orders of magnitude larger than this. A non-P4 plugin can be used to transform user-facing table 400 into P4 runtime table 402.

The following P4 code references the plugin that transforms the user-friendly table into the P4 runtime table. In the code example, the lines preceded by the "@" symbol represent annotations which reference the non-P4 plugin used to transform the user-facing table into the P4 runtime table. The remaining code is a P4 code snippet which defines a table of size 1024, whose table index is some hash value computed earlier in the code. It is the plugin's responsibility to populate this table with a number of port entries proportional to their relative load-balancer weights. The P4 info snippet shown is metadata created by the P4 compiler from the P4 code. The P4Info is used by the controller as part of the mechanism to access (read and write) the table in the target network visibility device.

P4 Code:
```
@plugin("'name':'xform_lb_tbl', 'type':'xform'")
table lb_port_tbl {
key={
meta.lb_hash: exact;
}
actions={
set_hashed_lb_port;
}
size=1024;
```
P4 Info:
```
tables {
   preamble {
      id: 33619954
      name: "lb_port_tbl"
      alias: "lb_port_tbl"
      annotations:     "@plugin(\"name:xform_lb_tbl,type:xform\")"
   }
```

The following example is a skeleton of the non-P4 transform plugin that may be used to generate the P4 runtime table.

Example Python Plugin (Skeleton):
```
class xform_lb_tbl(P4rt_Xform):
'''
This class transforms a user-facing table of ports and relative weights
   into a weighted-entry load balancing table.
'''
```

```
def_init_:
    P4rt_Xform.init( )
def write_tbl(port_weight_tbl,1024):
    p4_tbl=xform_to_p4(port_weight_tbl,1024)
    write_tbl_to_device('lb_port_tbl', p4_tbl)   # parent
        method—write data to device
def xform_to_p4(port_weight_tbl,size):
    p4_tbl=[ ]
    # Algorithm to create weighted entry table data not shown
    . . .
    return p4_tbl
```

Example 2—Autorendering Pop-Up Graph Widgets

Figure 5:
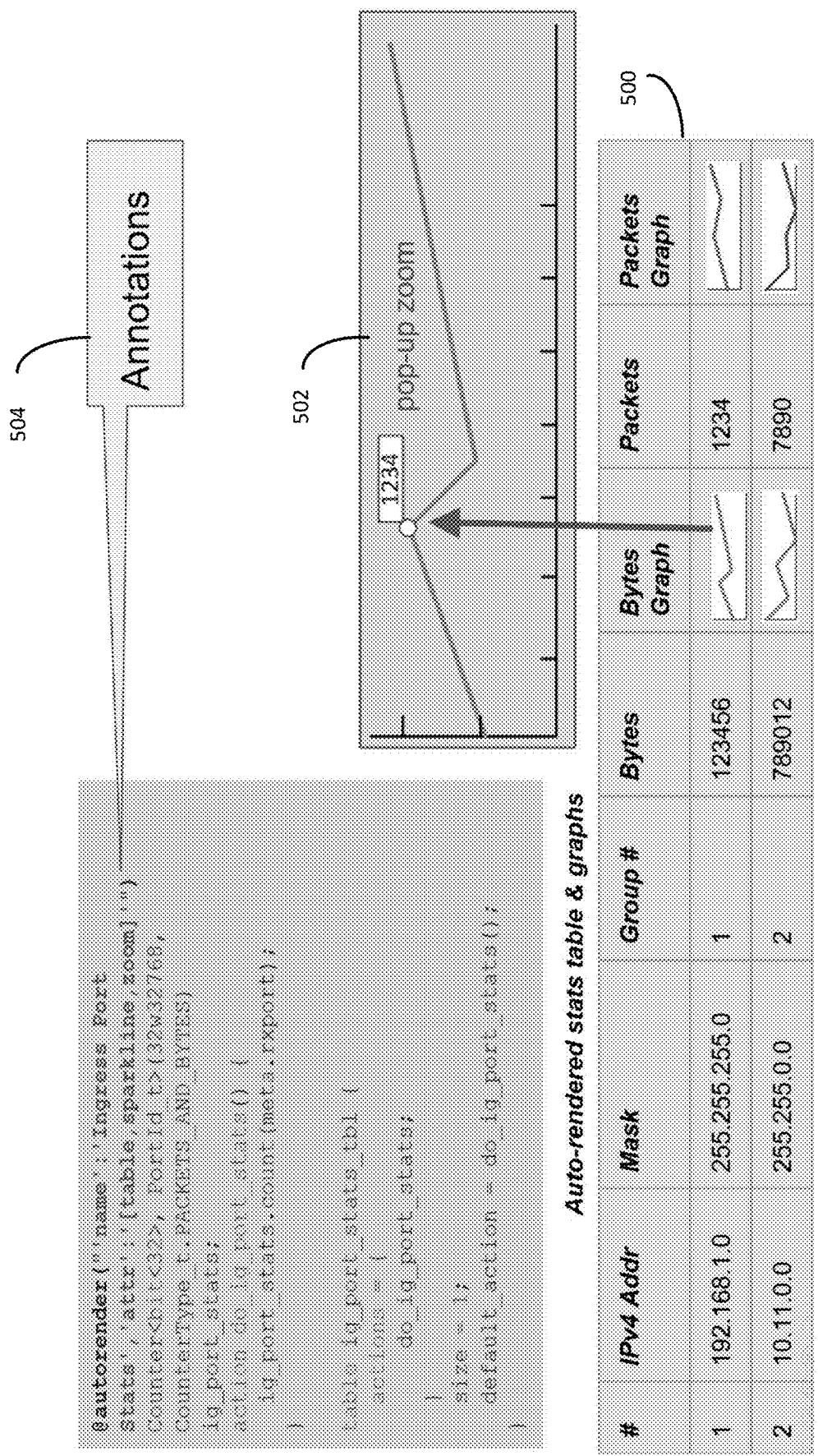
FIG. 5 is a diagram illustrating the use of P4 code in combination with a plugin to generate a packet statistics table and a pop-up graph.

In this example, the application framework of the target network visibility device or the controller can auto-render a statistics table with built-in sparkline graphs (https://en.wikipedia.org/wiki/Sparkline) which embed a hyperlink to invoke a full-sized zoomable graph. FIG. 5 illustrates an example of a statistics table 500, a sparkline graph 502, and corresponding code 504 including annotations referencing a plugin that can be used to generate table 500 and graph 502. The following code is the same code 504 illustrated in FIG. 5 that can be used to generate table 500 and graph 502. The lines of code preceded with the "@" character are annotations that reference the plugin. The remaining P4 code defines fields in the statistics table. The P4 info is metadata generated by the P4 compiler describing the statistics table and sparkline graph accessible via the table.

```
@autorender("'name':'Ingress Port
    Stats', 'attr':'[table,sparkline,zoom]'")
Counter<bit<32>, PortId_t>(32w32768,
CounterType_t.PACKETS_AND_BYTES) ig_port_stats;
action do_ig_port_stats( ) {
    ig_port_stats.count(meta.rxport);
}
table ig_port_stats_tbl {
    actions={
        do_ig_port_stats;
    }
    size=1;
    default_action=do_ig_port_stats( );
}
P4 Info:
externs {
    extern_type_id: 131
    extern_type_name: "Counter"
    instances {
        preamble {
            id: 2197879518
            name: "process_ig_port_stats.ig_port_stats"
            alias: "ig_port_stats"
            annotations: "@autorender(\'\'name\':\'Ingress Port
                Stats\',\'attr\':\'[table,sparkline,zoom]\'\'")"
        }
```

Example 3—Table Initialization Plugin

In this example, the P4 code contains a table which requires initialization at P4-program load/startup phase using an algorithm. The annotation in the P4 code causes the software application framework in the target network visibility device, or the controller, to invoke a plugin distributed with the compiled P4 code, which can generate the required values to populate the table. The software application framework of the target network visibility device or controller is not required to know how to initialize the table. Only the P4 code developer is required to know the steps for table initialization, and those steps can be implemented by the plugin referenced by P4 code annotation. In the example, the P4 code contains an annotation that references the non-P4 plugin used to initialize values in a destination medium access control (MAC) rewrite table. Based on the values of the table keys, the MAC will be modified. The table can be generated statically using an algorithm specified in the plugin. The P4 info is metadata created by the P4 compiler and causes the application framework to invoke the plugin, which will in turn populate the destination MAC rewrite table with required data values.

```
P4 Code:
@plugin("name:rewrite_dmac_tbl,type:init")
table rewrite_dmac_tbl {
key={
meta.inner_tunnel_type: exact;
meta.lb_type:exact;
meta.lb_port_group:exact;
P4 Info:
tables {
    preamble {
    id: 33578275
    name: "rewrite_dmac"
    alias: "rewrite_dmac"
annotations:    "@plugin(\"name:rewrite_dmac_tbl,type:
init\")"
}
```

The following is an example of the non-P4 plugin used to populate the destination MAC address table.

```
class rewrite_dmac_tbl(P4rt_Init):
    '''
    This class initializes the rewrite_dmac table with
static values
    '''
    def __init__:
        P4rt_Init ( )
    def write_tbl ( ):
        p4_tbl = generate_data ( )
        write_tbl_to_device('rewrite_dmac', p4_tb1) #
parent method - write data to P4 device tables
    def generate_data ( ):
        p4_tbl = [ ]
        for t in range (4):
            for g in range (8):
                b = ((t << 6) + (g<<2) + 2)<<40
                p4_tbl.append( [t,g,b])
            return p4_tbl
```

Thus, using P4 code in combination with plugins, the time to implement new network visibility device features is decreased over the conventional feature development pipeline. Using plugins also allows network visibility functionality to be extended beyond that provided by P4 code alone and without requiring changes to native network visibility device software, such as operation system software.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing a dynamically configurable, distributed network visibility device, the method comprising:

providing at least one target network visibility device for monitoring network packets, wherein the at least one target network visibility device comprises a network packet broker or a network tool optimizer including a P4-configurable switching module, at least one network port for receiving packets from a monitored network, and at least one tool port for providing the monitored packets to at least one network tool;

providing a controller for receiving a P4 code package including or compilable into a P4 device image and a non-P4 plugin;

loading the P4 device image into the P4-configurable switching module of the at least one target network visibility device and using the P4 device image to configure the at least one target network visibility device to implement a desired network visibility device feature, wherein the desired network visibility device feature includes at least one of packet filtering, packet de-duplication, and packet statistics generation by the network packet broker or the network tool optimizer for the packets from the monitored network; and using the non-P4 plugin to automatically render a user interface of the at least one target network visibility device, wherein using the non-P4 plugin to automatically render the user interface includes providing P4 source code including P4 code annotations referencing the non-P4 plugin to the controller and generating, by the controller, using the P4 code annotations and the plugin, the user interface, wherein the P4 code annotations include P4Info generated by a P4 compiler, which, when read by the controller, causes the controller to invoke the non-P4 plugin.

2. The method of claim 1 wherein providing at least one target network visibility device includes providing at least one network packet broker.

3. The method of claim 1 wherein providing at least one target network visibility device includes providing at least one network tool optimizer.

4. The method of claim 1 wherein the P4-configurable switching module comprises a P4-configurable hardware or firmware module.

5. The method of claim 1 wherein the P4-configurable switching module comprises a virtual P4-configurable switching module.

6. The method of claim 1 wherein the non-P4 plugin automatically renders at least one user interface element in the user interface for displaying packet statistics.

7. The method of claim 6 wherein the at least one user interface element comprises a packet statistics table and a popup graph accessible via the packet statistics table.

8. The method of claim 1 wherein the non-P4 plugin transforms a user-facing load balancing table into a P4 runtime load balancing table.

9. The method of claim 1 the non-P4 plugin automatically initializes values in a network address table.

10. The method of claim 1 wherein the plugin extends functionality of the target network visibility device without requiring modification of code resident on the target network visibility device.

11. A system for providing a dynamically configurable, distributed network visibility device, the system comprising:

at least one target network visibility device comprising a network packet broker or a network tool optimizer for monitoring network packets, wherein the at least one target network visibility device includes a P4-configurable switching module, at least one network port for receiving packets from a monitored network, and at least one tool port for providing the monitored packets to at least one network tool;

a controller for receiving a P4 code package including or compilable into a P4 device image and a non-P4 plugin loading the P4 device image into the P4-configurable switching module of the at least one target network visibility device to configure the P4 configurable switching module to implement a desired network visibility device feature, wherein the desired network visibility device feature includes at least one of packet filtering, packet de-duplication, and packet statistics generation by the network packet broker or the network tool optimizer for the packets from the monitored network; and wherein the controller uses the non-P4 plugin to automatically render a user interface of the at least one target network visibility device, wherein using the non-P4 plugin to automatically render the user interface includes providing P4 source code including P4 code annotations referencing the non-P4 plugin to the controller and generating, by the controller, using the P4 code annotations and the plugin, the user interface, wherein the P4 code annotations include P4Info generated by a P4 compiler, which, when read by the controller, causes the controller to invoke the non-P4 plugin.

12. The system of claim 11 wherein the at least one target network visibility device includes at least one network packet broker.

13. The system of claim 11 wherein the at least one target network visibility device includes at least one network tool optimizer.

14. The system of claim 11 wherein the P4-configurable switching module comprises a P4-configurable hardware or firmware module.

15. The system of claim 11 wherein the P4-configurable switching module comprises a virtual P4-configurable switching module.

16. The system of claim 11 wherein the non-P4 plugin automatically renders at least one user interface element in the user interface for displaying packet statistics.

17. The system of claim 16 wherein the at least one user interface element comprises a packet statistics table and a popup graph accessible via the packet statistics table.

18. The system of claim 11 wherein the non-P4 plugin transforms a user-facing load balancing table into a P4 runtime load balancing table.

19. The system of claim 11 the non-P4 plugin automatically initializes values in a network address table.

20. A non-transitory computer readable medium having stored thereon executable instructions that when executed by a processor of a computer controls the computer to perform steps comprising:

providing at least one target network visibility device for monitoring network packets, wherein the at least one target network visibility device comprises a network packet broker or a network tool optimizer including a P4-configurable switching module, at least one network port for receiving packets from a monitored network, and at least one tool port for providing the monitored packets to at least one network tool;

providing a controller for receiving a P4 code package, including or compilable into a P4 device image and a non-P4 plugin;

loading the P4 device image into the configurable switching module of the at least one target network visibility device and using the P4 device image to configure the P4-configurable switching module to implement a desired network visibility device feature, wherein the desired network visibility device feature includes at least one of packet filtering, packet de-duplication, and packet statistics generation by the network packet broker or the network tool optimizer for the packets from the monitored network; and using the non-P4 plugin to automatically render a user interface of the at least one target network visibility device, wherein using the non-P4 plugin to automatically render the user interface includes providing P4 source code including P4 code annotations referencing the non-P4 plugin to the controller and generating, by the controller, using the P4 code annotations and the plugin, the user interface, wherein the P4 code annotations include P4Info generated by a P4 compiler, which, when read by the controller, causes the controller to invoke the non-P4 plugin.

* * * * *